W. F. COLLINS.
FLUID COMPRESSOR.
APPLICATION FILED FEB. 17, 1913.
1,200,170.
Patented Oct. 3, 1916.
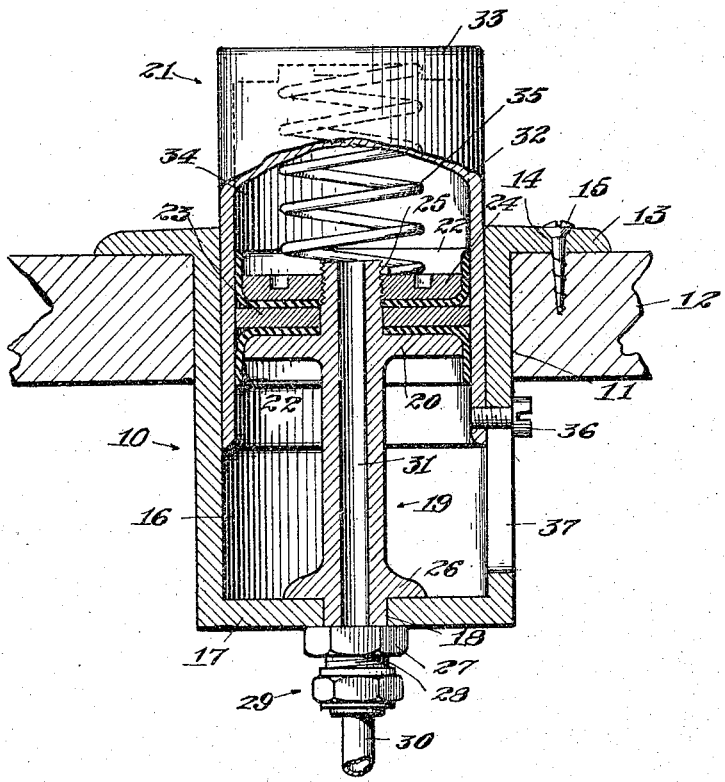
Inventor,
William F. Collins.
by Hazard Berry and Miller
attys.

UNITED STATES PATENT OFFICE.

WILLIAM F. COLLINS, OF PASADENA, CALIFORNIA.

FLUID-COMPRESSOR.

1,200,170. Specification of Letters Patent. Patented Oct. 3, 1916.

Application filed February 17, 1913. Serial No. 748,800.

*To all whom it may concern:*

Be it known that I, WILLIAM F. COLLINS, a citizen of the United States, and residing in the city of Pasadena, county of Los Angeles, State of California, have invented a new and useful Improvement in Fluid-Compressors, of which the following is a specification.

This invention relates to a fluid compressor and the principal object is to provide a compressor mechanism for actuating flush tank mechanism and other apparatus by fluid transmission.

Another object is to provide a device of the character described which operates through a conduit to produce motion in a mechanism which may be remote from the compressor.

It is an object to provide a simple compressor which may be mounted on the floor and has an actuating device projecting above the surface of the floor which may be engaged by the foot and depressed to compress the fluid therein, and having means for retracting the actuating device on release thereof.

It is a further object to provide a device of the class described which is simple in construction and easily operated.

Other objects will appear hereinafter.

The invention is illustrated in the accompanying drawings in which the figure is a view in vertical section and elevation of my compressor and showing it as mounted upon a floor.

More specifically, 10 indicates a cylindrical socket having its body portion projecting through an opening 11 in a floor or wall 12. Formed upon the one end of said socket is a flange 13 which extends outwardly and rests upon the surface of the floor. This flange is provided with counter-bores 14 through which wood-screws 15 project and engage the floor. In this manner the socket is securely held in position. The body portion of the socket is formed with a longitudinally extending bore 16 which is closed at its lower end by a wall 17. A small bore 18 is formed concentric with the bore 16 and through the wall 17.

The bore 18 is designed to receive one end of a tubular piston pillar 19, which pillar is here shown as cylindrical in section and extending at right angles to the wall 17. Formed integral with the pillar and adjacent its outer end is a collar 20 which forms the base for the piston. The outside diameter of the collar is of a smaller diameter than the bore 16 and so designed as to allow the passage of the wall of a reciprocable cylinder 21 and cup packing washers 22 therebetween. One of the packing washers fits securely over the circumference of the collar 20 and is held in place by a steel or metal washer 23. Positioned above the washer 23 is a cup washer identical with the one previously referred to. These two washers and the metallic washer are held in position by a circular nut 24 which engages threads 25 on the outer end of the pillar. The attached end of the pillar 19 is formed with a shoulder 26 which rests upon the inner face of the wall 17 and is held thereagainst by a nut 27 engaging threads 28 on the lower end of the pillar. These threads also serve as a mounting for a pipe-union 29 adapted to unite the lower end of the pillar 19 with a conduit 30, said conduit leading into the bore 31 which extends the full length of the pillar and affords a passage for fluid from the cylinder 21 into the conduit, thus allowing the fluid compressed within cylinder 21 to pass through the piston to the conduit and on to the mechanism intended to be actuated thereby.

The cylinder 21 has an annular side wall 32 and an end wall 33, this forming a simple cap which is placed with its mouth downward over the piston and within the bore 16 of the socket. The thickness of the walls 32 of the cylinder are of the proper width to snugly fill the space formed between the inner diameter of the bore 16 and the outer diameter of the cup washers 22. It will thus be seen that when the plunger cylinder is pressed downwardly, fluid therein will be compressed in the chamber 34 formed above the piston, and forced through the pillar and conduit to actuate fluid pressure operated devices. A spring 35 is provided to draw the cylinder back into its normal position, this position being limited by a set screw 36 which engages the wall of the cylinder near its lower end and which is adapted to move vertically in a slot 37 formed along one side of the lower portion of the flange 13.

In the operation of my compressor the conduit 30 is connected to the lower end of pillar 19 by the union 29, its opposite end being connected to the mechanism adapted to be operated by the compressor. The cylinder 21 is now pressed downwardly and in doing so causes the displacement of the air or other fluid in the chamber 34, said fluid passing through the passage 31 and into the conduit. Upon a discontinuance of the pressure upon the member 21, the spring 35 will cause it to rise. Attention is directed to the fact that in many mechanisms with which my compressor might be used it is not essential that the fluid forced from the chamber 34 be lost but that when the cylinder is released the spring 35 will draw it back through the conduit and relieve the pressure which exists between the compressor and the actuated mechanism. In so doing the compressor will be fitted for causing another impulse within the conduit.

What I claim is:

1. A compressor comprising a socket, a pillar rigidly mounted on the bottom of said socket, said pillar being formed with a bore, a piston rigidly mounted on said pillar, a cylinder open at its lower end and closed at its upper end reciprocally mounted in the socket with its outer periphery slidably contacting the inner periphery of the socket and its inner periphery slidably contacting the piston, and a spring interposed between the piston and the upper end of the cylinder for normally maintaining the latter in its uppermost position.

2. A compressor of the character described, comprising a cylindrical socket, a tubular pillar supported in said socket, a pipe connection on the lower end of said pillar, a piston head rigidly mounted on said pillar, a reciprocal cylinder having its cylindrical walls interposed between the piston head and the walls of the socket, said reciprocal cylinder closed at its upper end forming a chamber above the piston head communicating with the bore in the pillar, and a spring interposed between the piston head and the top of the reciprocal cylinder to maintain the latter in its uppermost positon.

3. A compressor of the character described, comprising a cylindrical socket, a tubular pillar supported in said socket, a pipe connection on the lower end of said pillar, a piston head rigidly mounted on said pillar, a cylinder having its cylindrical walls interposed between the piston and the walls of the socket, said cylinder closed at its upper end forming a chamber above the piston communicating with the bore in the pillar, and a spring interposed between the piston and the top of the cylinder to maintain the latter in its uppermost position, and means for holding the cylinder against rotation including a stud connected to the wall thereof extending through a vertical slot in the walls of the socket.

4. A compressor of the character described, comprising a socket, a piston rigidly secured within said socket, a hollow plunger open at its inner end, said plunger sliding in the socket and containing the piston, spring means for holding the plunger normally in its elevated position, and means extending through said piston and socket to connect the chamber formed in the upper end of the plunger above the piston with the exterior of the socket.

In witness that I claim the foregoing I have hereunto subscribed my name this 11th day of February, 1913.

WILLIAM F. COLLINS.

Witnesses:
W. P. KEENE,
MARIE BATTEY.

Copies of this patent may be obtained for five cents each, by addressing the "Commissioner of Patents, Washington, D. C."